(12) United States Patent
Agrawal (10) Patent No.: US 12,555,104 B2
(45) Date of Patent: *Feb. 17, 2026

(54) METHOD, SYSTEM, AND COMPUTER PROGRAM PRODUCT FOR DYNAMICALLY ENSURING SDK INTEGRITY

(71) Applicant: Visa International Service Association, San Francisco, CA (US)

(72) Inventor: Shobhit Agrawal, Bothell, WA (US)

(73) Assignee: Visa International Service Association, San Francisco, CA (US)

( * ) Notice: Subject to any disclaimer, the term of this patent is extended or adjusted under 35 U.S.C. 154(b) by 431 days.

This patent is subject to a terminal disclaimer.

(21) Appl. No.: 18/088,311

(22) Filed: Dec. 23, 2022

(65) Prior Publication Data

US 2023/0126584 A1    Apr. 27, 2023

Related U.S. Application Data

(63) Continuation of application No. 16/718,475, filed on Dec. 18, 2019, now Pat. No. 11,587,075.

(51) Int. Cl.
*H04L 9/32*    (2006.01)
*G06F 8/00*    (2018.01)
(Continued)

(52) U.S. Cl.
CPC .......... *G06Q 20/3827* (2013.01); *G06F 8/00* (2013.01); *G06F 8/61* (2013.01); *G06Q 20/027* (2013.01);
(Continued)

(58) Field of Classification Search
USPC ...................................................... 717/148
See application file for complete search history.

(56) References Cited

U.S. PATENT DOCUMENTS 8,516,578 B1   8/2013  Tavares
9,262,600 B2   2/2016  Morgan
(Continued)

FOREIGN PATENT DOCUMENTS

CN   105556553 A   5/2016
CN   107615321 A   1/2018
(Continued)

OTHER PUBLICATIONS

Wikipedia—"Transport Layer Security" as archived on Nov. 26, 2019 and retrieved on May 1, 2025 from <https://en.wikipedia.org/w/index.php?title=Transport_Layer_Security&oldid=928076484> (Year: 2019).*

(Continued)

*Primary Examiner* — Jason D Mitchell
(74) *Attorney, Agent, or Firm* — The Webb Law Firm (57) ABSTRACT

A method, system, and computer program product for dynamically ensuring SDK integrity load, at a merchant system, a software development kit (SDK) wrapper from a payment gateway system via a merchant webpage associated with the merchant system; execute the SDK wrapper, the SDK wrapper loading an SDK core when executed; determine an integrity of the SDK core; in response to determining the integrity of the SDK core, perform a handshake between the SDK wrapper and the SDK core and overload a real function exported by the SDK wrapper; and provide, from the merchant system via the SDK core, a secure payment container request to a payment gateway system.

16 Claims, 4 Drawing Sheets

(51) Int. Cl.
*G06F 8/61* (2018.01)
*G06Q 20/02* (2012.01)
*G06Q 20/38* (2012.01)

(52) U.S. Cl.
CPC .......... *H04L 9/3213* (2013.01); *H04L 9/3234* (2013.01)

(56) References Cited

U.S. PATENT DOCUMENTS

| | | | |
|---|---|---|---|
| 9,830,596 B2* | 11/2017 | Collison | G06Q 20/3829 |
| 10,382,203 B1* | 8/2019 | Loladia | H04L 63/06 |
| 10,630,648 B1* | 4/2020 | Borunda | H04L 9/3213 |
| 11,587,075 B2* | 2/2023 | Agrawal | H04L 9/3234 |
| 2003/0140007 A1 | 7/2003 | Kramer et al. | |
| 2005/0060568 A1 | 3/2005 | Beresnevichiene et al. | |
| 2010/0251340 A1* | 9/2010 | Martin | G06F 9/541 726/4 |
| 2011/0129088 A1* | 6/2011 | Lee | H04L 9/3247 380/44 |
| 2013/0318056 A1* | 11/2013 | Lekies | G06F 21/64 707/697 |
| 2013/0346302 A1 | 12/2013 | Purves et al. | |
| 2014/0052617 A1 | 2/2014 | Chawla et al. | |
| 2015/0269539 A1* | 9/2015 | MacGregor | H04L 63/08 705/39 |
| 2015/0310423 A1 | 10/2015 | Desai et al. | |
| 2016/0005030 A1 | 1/2016 | Girish | |
| 2018/0060867 A1* | 3/2018 | Hagan | G06Q 20/34 |
| 2018/0114000 A1 | 4/2018 | Taylor | |
| 2018/0189463 A1* | 7/2018 | Murphy | G06F 8/61 |
| 2019/0116037 A1 | 4/2019 | Donaldson et al. | |
| 2019/0199530 A1 | 6/2019 | Reitsma et al. | |
| 2019/0253333 A1 | 8/2019 | Briere | |
| 2020/0098027 A1* | 3/2020 | Serrano | H04L 67/02 |

FOREIGN PATENT DOCUMENTS

| | | |
|---|---|---|
| CN | 108141727 A | 6/2018 |
| CN | 110020955 A | 7/2019 |
| WO | 2007115341 A2 | 10/2007 |

OTHER PUBLICATIONS

Addison_Wesley_The_Object_Oriented Through Process (Year: 2009).
"Approov: Authenticating Mobile Apps", CriticalBlue, 2016, pp. 1-15.
authorize.net or cybersource or VISA Exhibits Labeled 1-10 (Year: 2022).
Authorize.net API Documentation—Accept.js (Year: 2022).
C++ pure virtual functions, virtual functions, real functions, abstract classes, overloading, overriding, redefining (Year: 2017).
Computer Hope What is a Library (Year: 2021).
Geekboots, Polymorphism vs Method Overloading (Year: 2022).
GitHub—AuthorizeNet_sdk-python_Python SDK for the Authorize. Net API (Year: 2022).
HTML script Integrity Attribute (Year: 2022).
IEEE dictionary (7th Ed.) (Year: 2018).
Javascript—Accept.js from Authrorize.net Implementation—Stack Overflow (Year:2022).
Microsoft Computation Dictionary 5th Ed., p. 245 defining handshake (Year: 2022).
Microsoft Computation Dictionary 5th Ed., p. 309 defining library (Year: 2022).
Microsoft Computation Dictionary 5th Ed., p. 575 defining wrapper (Year: 2022).
Overload Definition IEEE of overload (Year: 2022).
Subresource Integrity W3C Recommendation Jun. 23, 2016 (Year: 2016).
Subresource Integrity—Wikipedia (Year:2022).
Wayback Machine, Subresource Integrity—Web security_MDN (Year: 2019).
What is software development kit (SDK)—Definition from WhatIs. com (Year:2022).
Youtube Javascript—Create a Wrapper Class (Year: 2022).
Youtube WebGL 3D Graphics Explained in 100 Seconds (Year: 2022).

* cited by examiner

METHOD, SYSTEM, AND COMPUTER PROGRAM PRODUCT FOR DYNAMICALLY ENSURING SDK INTEGRITY

CROSS-REFERENCE TO RELATED APPLICATION

This application is a continuation of U.S. patent application Ser. No. 16/718,475 filed, Dec. 18, 2019, the disclosure of which is hereby incorporated by reference in its entirety.

BACKGROUND

1. Field

This disclosure relates generally to systems, devices, products, apparatus, and methods for software development kits (SDKs), and in some embodiments or aspects, to a method, a system, and a product for dynamically ensuring SDK integrity.

2. Technical Considerations

Accept.js is a JavaScript library for sending secure payment data directly to a payment gateway system (e.g., Authorize.Net, etc.). Accept.js captures the payment data and submits it directly to the payment gateway system, in exchange for a one-time-use token, or payment nonce. This payment nonce can be used in the place of payment data in a follow-on createTransactionRequest API call. AcceptCore.js validates information passed from the merchant webpage to the payment gateway system, and calls a secure payment container request in response to the information being validated. The Accept.js and AcceptCore.js libraries are described by the Authorize.Net API Reference published at https://developer.authorize.net/api/reference/, the entire contents of which is hereby incorporated by reference in its entirety.

When a merchant webpage loads a client side software development kit (SDK), such as the Authorize.Net provided client side SDK by adding the Accept.js and AcceptCore.js libraries to the merchant webpage as script tags, a man-in-the-middle attack may change the SDK. Accordingly, there is a need to verify that the SDK is intact. The merchant website may include a W3C Subresource Integrity check, which is defined by the W3C Recommendation published at https://www.w3.org/TR/SRI/ on Jun. 23, 2016, the entire contents of which is hereby incorporated by reference in its entirety, and which is a mechanism by which user agents may verify that a fetched resource has been delivered without unexpected manipulation. For example, an integrity check hash from the W3C Subresource Integrity mechanism may be added to the merchant webpage as a script tag with the AcceptCore.js library to check the integrity of the AcceptCore.js library. However, if a new version of the AcceptCore.js library is released and/or the AcceptCore.js library is changed, the hash is changed and, thus, the merchant webpage must be updated to reflect the change in order for the AcceptCore.js library to pass or satisfy the integrity check. A merchant may thus take the integrity check hash completely out of the merchant webpage to avoid having to repeatedly update the merchant webpage, which opens transactions conducted at the merchant webpage to man-in-the middle attacks and/or the like. Accordingly, there is a need in the art for improving SDK integrity checks.

SUMMARY

Accordingly, provided are improved systems, devices, products, apparatus, and/or methods for dynamically ensuring SDK integrity.

According to some non-limiting embodiments or aspects, provided is a computer-implemented method including: loading, with at least one processor, at a merchant system, a software development kit (SDK) wrapper from a payment gateway system via a merchant webpage associated with the merchant system; executing, with at least one processor, the SDK wrapper, wherein the SDK wrapper loads an SDK core when executed; determining, with at least one processor, an integrity of the SDK core; in response to determining the integrity of the SDK core, performing, with at least one processor, a handshake between the SDK wrapper and the SDK core and overloading a real function exported by the SDK wrapper; and providing, with at least one processor, from the merchant system via the SDK core, a secure payment container request to a payment gateway system.

In some non-limiting embodiments or aspects, the method further includes: receiving, with at least one processor, at the merchant system via the merchant webpage, account data associated with an account of a user, wherein the SDK wrapper is loaded in response to receiving the account data via the merchant webpage, and wherein the secure payment container request includes the account data.

In some non-limiting embodiments or aspects, the method further includes: receiving, with at least one processor, from the payment gateway system, a token associated with the account data in response to providing the secure payment container request.

In some non-limiting embodiments or aspects, determining the integrity of the SDK core includes performing a W3 subresource integrity check hash on the SDK core.

In some non-limiting embodiments or aspects, the secure payment container request is provided in response to a successful handshake between the SDK wrapper and the SDK core.

In some non-limiting embodiments or aspects, executing the SDK wrapper exposes the real function as a public method, and the real function throws an error in response to being called by the merchant system.

In some non-limiting embodiments or aspects, the SDK wrapper includes an Accept.js library, and the SDK core includes an AcceptCore.js library.

According to some non-limiting embodiments or aspects, provided is a computing system including: one or more processors programmed and/or configured to: load, at a merchant system, a software development kit (SDK) wrapper from a payment gateway system via a merchant webpage associated with the merchant system; execute the SDK wrapper, wherein the SDK wrapper loads an SDK core when executed; determine an integrity of the SDK core; in response to determining the integrity of the SDK core, perform a handshake between the SDK wrapper and the SDK core and overloading a real function exported by the SDK wrapper; and provide, from the merchant system via the SDK core, a secure payment container request to a payment gateway system.

In some non-limiting embodiments or aspects, the one or more processors are further programmed and/or configured to: receive, at the merchant system via the merchant webpage, account data associated with an account of a user, wherein the SDK wrapper is loaded in response to receiving the account data via the merchant webpage, and wherein the secure payment container request includes the account data.

In some non-limiting embodiments or aspects, the one or more processors are further programmed and/or configured to: receive, from the payment gateway system, a token associated with the account data in response to providing the secure payment container request.

In some non-limiting embodiments or aspects, determining the integrity of the SDK core includes performing a W3 subresource integrity check hash on the SDK core.

In some non-limiting embodiments or aspects, the secure payment container request is provided in response to a successful handshake between the SDK wrapper and the SDK core.

In some non-limiting embodiments or aspects, executing the SDK wrapper exposes the real function as a public method, and the real function throws an error in response to being called by the merchant system.

In some non-limiting embodiments or aspects, the SDK wrapper includes an Accept.js library, and the SDK core includes an AcceptCore.js library.

According to some non-limiting embodiments or aspects, provided is a computer program product including at least one non-transitory computer-readable medium including program instructions that, when executed by at least one processor, cause the at least one processor to: load, at a merchant system, a software development kit (SDK) wrapper from a payment gateway system via a merchant webpage associated with the merchant system; execute the SDK wrapper, wherein the SDK wrapper loads an SDK core when executed; determine an integrity of the SDK core; in response to determining the integrity of the SDK core, perform a handshake between the SDK wrapper and the SDK core and overloading a real function exported by the SDK wrapper; and provide, from the merchant system via the SDK core, a secure payment container request to a payment gateway system.

In some non-limiting embodiments or aspects, the instructions further cause the at least one processor to: receive, at the merchant system via the merchant webpage, account data associated with an account of a user, wherein the SDK wrapper is loaded in response to receiving the account data via the merchant webpage, and wherein the secure payment container request includes the account data.

In some non-limiting embodiments or aspects, the instructions further cause the at least one processor to: receive, from the payment gateway system, a token associated with the account data in response to providing the secure payment container request.

In some non-limiting embodiments or aspects, determining the integrity of the SDK core includes performing a W3 subresource integrity check hash on the SDK core.

In some non-limiting embodiments or aspects, the secure payment container request is provided in response to a successful handshake between the SDK wrapper and the SDK core.

In some non-limiting embodiments or aspects, executing the SDK wrapper exposes the real function as a public method, and the real function throws an error in response to being called by the merchant system.

In some non-limiting embodiments or aspects, the SDK wrapper includes an Accept.js library, and the SDK core includes an AcceptCore.js library.

Further embodiments or aspects are set forth in the following numbered clauses:

Clause 1. A computer-implemented method comprising: loading, with at least one processor, at a merchant system, a software development kit (SDK) wrapper from a payment gateway system via a merchant webpage associated with the merchant system; executing, with at least one processor, the SDK wrapper, wherein the SDK wrapper loads an SDK core when executed; determining, with at least one processor, an integrity of the SDK core; in response to determining the integrity of the SDK core, performing, with at least one processor, a handshake between the SDK wrapper and the SDK core and overloading a real function exported by the SDK wrapper; and providing, with at least one processor, from the merchant system via the SDK core, a secure payment container request to a payment gateway system.

Clause 2. The computer-implemented method of clause 1, further comprising: receiving, with at least one processor, at the merchant system via the merchant webpage, account data associated with an account of a user, wherein the SDK wrapper is loaded in response to receiving the account data via the merchant webpage, and wherein the secure payment container request includes the account data.

Clause 3. The computer-implemented method of clauses 1 or 2, further comprising: receiving, with at least one processor, from the payment gateway system, a token associated with the account data in response to providing the secure payment container request.

Clause 4. The computer-implemented method of any of clauses 1-3, wherein determining the integrity of the SDK core includes performing a W3 subresource integrity check hash on the SDK core.

Clause 5. The computer-implemented method of any of clauses 1-4, wherein the secure payment container request is provided in response to a successful handshake between the SDK wrapper and the SDK core.

Clause 6. The computer-implemented method of any of clauses 1-5, wherein executing the SDK wrapper exposes the real function as a public method, and wherein the real function throws an error in response to being called by the merchant system.

Clause 7. The computer-implemented method of any of clauses 1-6, wherein the SDK wrapper includes an Accept.js library, and wherein the SDK core includes an AcceptCore.js library.

Clause 8. A computing system comprising: one or more processors programmed and/or configured to: load, at a merchant system, a software development kit (SDK) wrapper from a payment gateway system via a merchant webpage associated with the merchant system; execute the SDK wrapper, wherein the SDK wrapper loads an SDK core when executed; determine an integrity of the SDK core; in response to determining the integrity of the SDK core, perform a handshake between the SDK wrapper and the SDK core and overloading a real function exported by the SDK wrapper; and provide, from the merchant system via the SDK core, a secure payment container request to a payment gateway system.

Clause 9. The computing system of clause 8, wherein the one or more processors are further programmed and/or configured to: receive, at the merchant system via the merchant webpage, account data associated with an account of a user, wherein the SDK wrapper is loaded in response to receiving the account data via the merchant webpage, and wherein the secure payment container request includes the account data.

Clause 10. The computing system of clauses 8 or 9, wherein the one or more processors are further programmed and/or configured to: receive, from the payment gateway system, a token associated with the account data in response to providing the secure payment container request.

Clause 11. The computing system of any of clauses 8-10, wherein determining the integrity of the SDK core includes performing a W3 subresource integrity check hash on the SDK core.

Clause 12. The computing system of any of clauses 8-11, wherein the secure payment container request is provided in response to a successful handshake between the SDK wrapper and the SDK core.

Clause 13. The computing system of any of clauses 8-12, wherein executing the SDK wrapper exposes the real function as a public method, and wherein the real function throws an error in response to being called by the merchant system.

Clause 14. The computing system of any of clauses 8-13, wherein the SDK wrapper includes an Accept.js library, and wherein the SDK core includes an AcceptCore.js library.

Clause 15. A computer program product comprising at least one non-transitory computer-readable medium including program instructions that, when executed by at least one processor, cause the at least one processor to: load, at a merchant system, a software development kit (SDK) wrapper from a payment gateway system via a merchant webpage associated with the merchant system; execute the SDK wrapper, wherein the SDK wrapper loads an SDK core when executed; determine an integrity of the SDK core; in response to determining the integrity of the SDK core, perform a handshake between the SDK wrapper and the SDK core and overloading a real function exported by the SDK wrapper; and provide, from the merchant system via the SDK core, a secure payment container request to a payment gateway system.

Clause 16. The computer program product of clause 15, wherein the instructions further cause the at least one processor to: receive, at the merchant system via the merchant webpage, account data associated with an account of a user, wherein the SDK wrapper is loaded in response to receiving the account data via the merchant webpage, and wherein the secure payment container request includes the account data.

Clause 17. The computer program product of clauses 15 or 16, wherein the instructions further cause the at least one processor to: receive, from the payment gateway system, a token associated with the account data in response to providing the secure payment container request.

Clause 18. The computer program product of any of clauses 15-17, wherein determining the integrity of the SDK core includes performing a W3 subresource integrity check hash on the SDK core.

Clause 19. The computer program product of any of clauses 15-18, wherein the secure payment container request is provided in response to a successful handshake between the SDK wrapper and the SDK core.

Clause 20. The computer program product of any of clauses 15-19, wherein executing the SDK wrapper exposes the real function as a public method, and wherein the real function throws an error in response to being called by the merchant system.

Clause 21. The computer program product of any of clauses 15-20, wherein the SDK wrapper includes an Accept.js library, and wherein the SDK core includes an AcceptCore.js library.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments or aspects that are illustrated in the accompanying schematic figures, in which.

DESCRIPTION

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing system executing one or more software applications. A transaction processing system may include one or more server computers with one or more processors and, in some non-limiting embodiments or aspects, may be operated by or on behalf of a transaction service provider.

As used herein, the term "account identifier" may include one or more Primary Account Numbers (PAN), tokens, or other identifiers (e.g., a globally unique identifier (GUID), a universally unique identifier (UUID), etc.) associated with a customer account of a user (e.g., a customer, a consumer, and/or the like). The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a personal account number (PAN), to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides products and/or services, or access to products and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" or "computer device" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" or "payment device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant (PDA), a security card, an access card, a wireless terminal, and/or a transponder, as examples. The portable financial device may include a volatile or a non-volatile memory to store information, such as an account identifier and/or a name of the account holder.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

Provided are improved systems, devices, products, apparatus, and/or methods for dynamically ensuring software development kit (SDK) integrity.

Non-limiting embodiments or aspects of the present disclosure are directed to systems, methods, and computer program products for dynamically ensuring SDK integrity that load, at a merchant system, a software development kit (SDK) wrapper from a payment gateway system via a merchant webpage associated with the merchant system; execute the SDK wrapper, the SDK wrapper loading an SDK core when executed; determine an integrity of the SDK core; in response to determining the integrity of the SDK core, perform a handshake between the SDK wrapper and the SDK core and overloading a real function exported by the SDK wrapper; and provide, from the merchant system via the SDK core, a secure payment container request to a payment gateway system.

In this way, non-limiting embodiments or aspects of the present disclosure may provide for an SDK wrapper that dynamically ensures a new or updated integrity check hash each time an SDK core is updated or changed and ensures that a merchant system uses a desired SDK wrapper from a payment gateway system, which enables removing a need for the merchant to update a merchant webpage and/or integrity check hash each time a SDK core is updated or changed and improved implementation of desired security measures by the merchant system.

Figure 1:
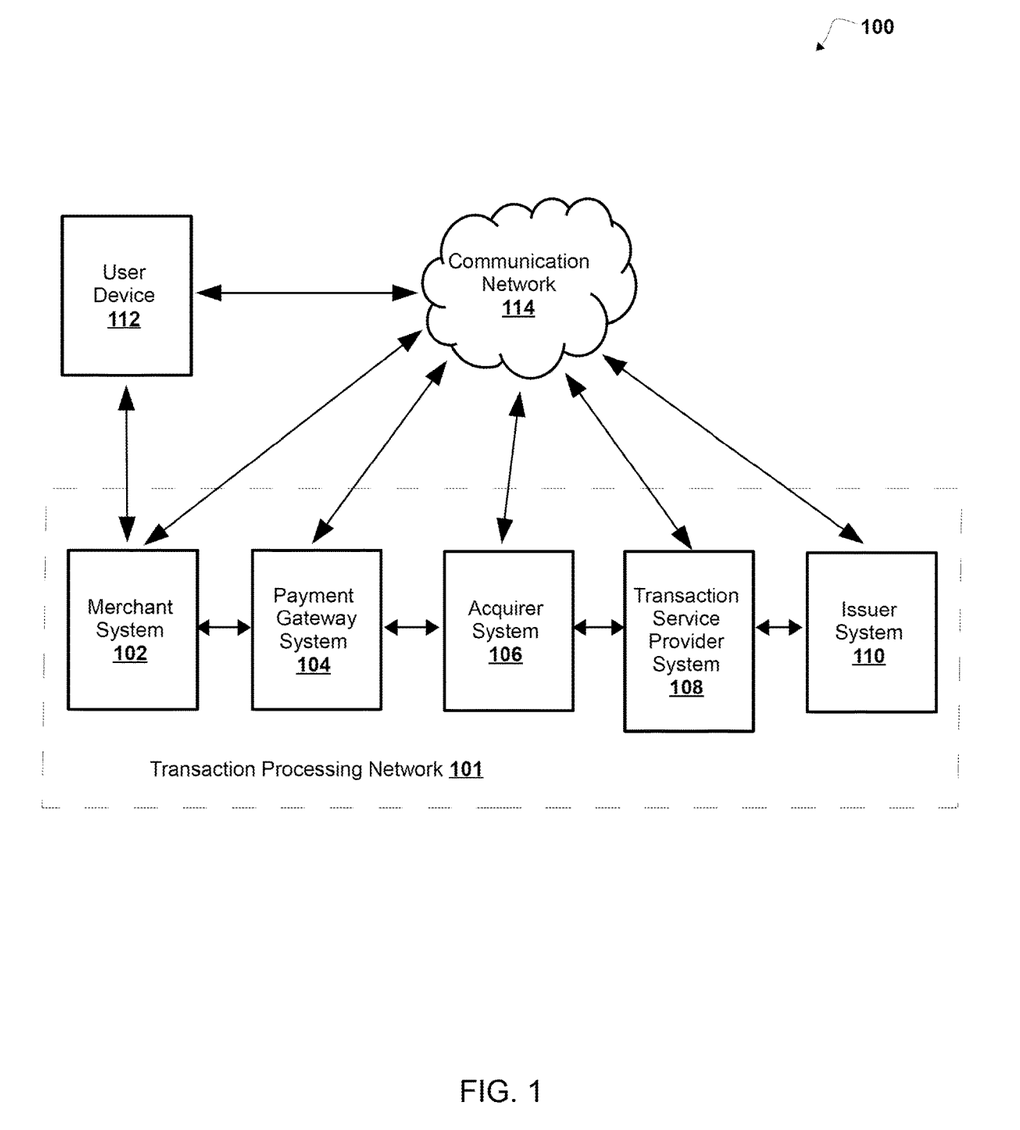
FIG. 1 is a diagram of non-limiting embodiments or aspects of an environment in which systems, devices, products, apparatus, and/or methods, described herein, may be implemented.

Referring now to FIG. 1, FIG. 1 is a diagram of an example environment 100 in which devices, systems, methods, and/or products described herein, may be implemented. As shown in FIG. 1, environment 100 includes transaction processing network 101, which may include merchant system 102, payment gateway system 104, acquirer system 106, transaction service provider system 108, and/or issuer system 110, user device 112, and/or communication network 114. Transaction processing network 101, merchant system 102, payment gateway system 104, acquirer system 106, transaction service provider system 108, issuer system 110, and/or user device 112 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 (e.g., via communication network 114, etc.) and/or communicating information and/or data to payment gateway system 104, acquirer system 106, transaction service provider system 108, issuer system 110, and/or user device 112 (e.g., via communication network 114, etc.). Merchant system 102 may include a device capable of receiving information and/or data from user device 112 via a communication connection (e.g., an NFC communication connection, an RFID communication connection, a Bluetooth® communication connection, etc.) with user device 112, and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, and/or user device 112 (e.g., via communication network 114, etc.) and/or communicating information and/or data to merchant system 102, acquirer system 106, transaction service provider system 108, issuer system 110, and/or user device 112 (e.g., via communication network 114, etc.). For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 (e.g., via communication network 114, etc.) and/or communicating information and/or data to merchant system 102, payment gateway system 104, transaction service provider system 108, issuer system 110, and/or user device 112 (e.g., via communication network 114, etc.). For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 (e.g., via communication network 114, etc.) and/or communicating information and/or data to merchant system 102, payment gateway system 104, acquirer system 106, issuer system 110, and/or user device 112 (e.g., via communication network 114, etc.). For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider 108 may include and/or access one or more one or more internal and/or external databases including account data, transaction data, merchant data, demographic data, and/or the like.

Issuer system 110 may include one or more devices capable of receiving information and/or data from merchant system 102, payment gateway system 104, acquirer system 106, transaction service provider system 108, and/or user device 112 (e.g., via communication network 114, etc.) and/or communicating information and/or data to merchant system 102, payment gateway system 104, acquirer system 106, transaction service provider system 108, and/or user device 112 (e.g., via communication network 114, etc.). For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 may include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 may process (e.g., receive, initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 (e.g., via communication network 114, etc.) and/or communicating information and/or data to merchant system 102, payment gateway system 104, acquirer system 106, transaction service provider system 108, and/or issuer system 110 (e.g., via communication network 114, etc.). For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, and/or the like) stored and/or executed on user device 112.

Communication network 114 may include one or more wired and/or wireless networks. For example, communication network 114 may include a cellular network (e.g., a long-term evolution (LTE) network, a third generation (3G) network, a fourth generation (4G) network, a fifth generation network (5F) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally or alternatively, a set of devices and/or systems (e.g., one or more devices or systems) of environment 100 may perform one or more functions described as being performed by another set of devices and/or systems of environment 100.

Figure 2:
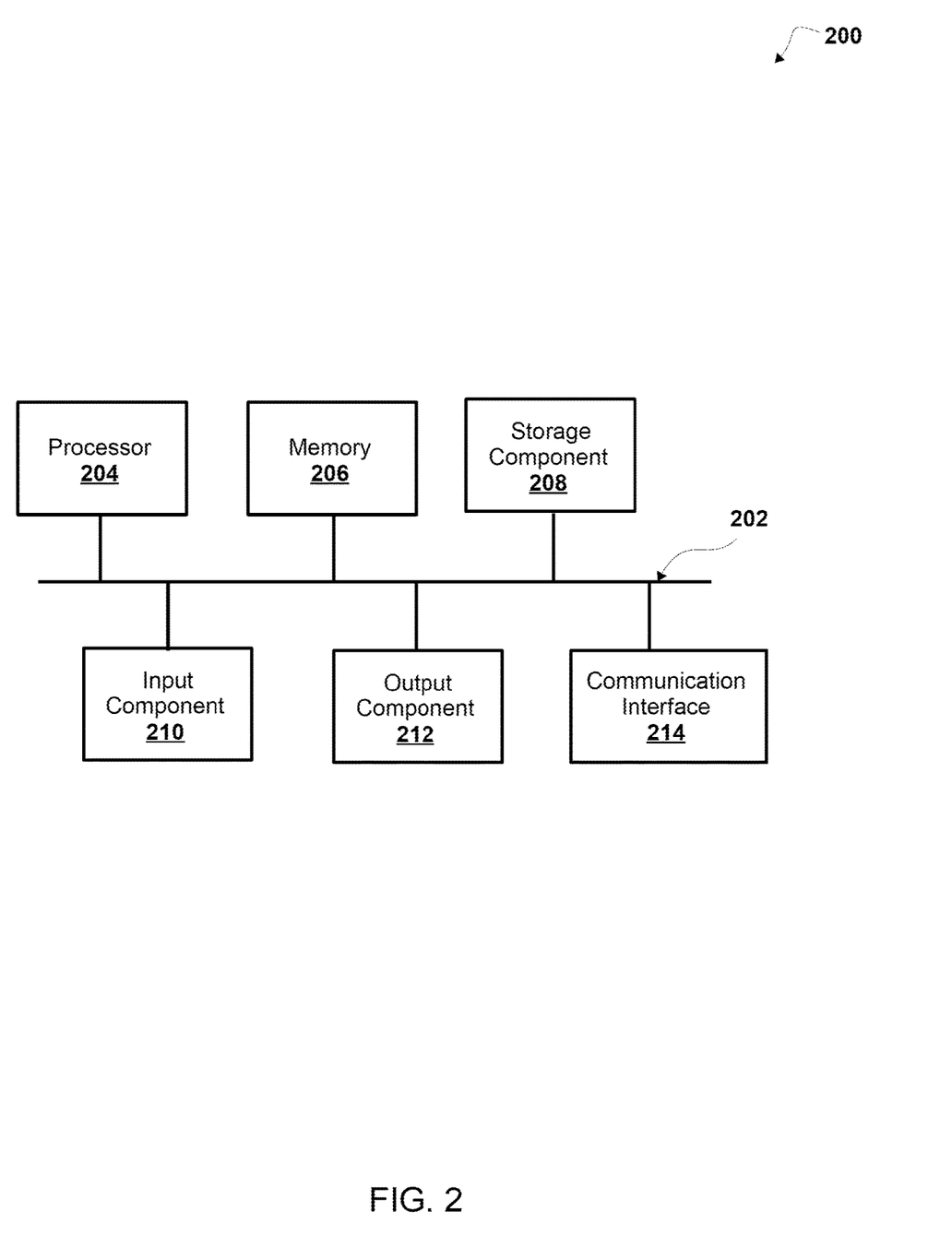
FIG. 2 is a diagram of non-limiting embodiments or aspects of components of one or more devices and/or one or more systems of FIG. 1.

Referring now to FIG. 2, FIG. 2 is a diagram of example components of a device 200. Device 200 may correspond to one or more devices of transaction processing network 101, one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.). In some non-limiting embodiments or aspects, one or more devices of transaction processing network 101, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), and/or one or more devices of communication network 114 may include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208. For example, transaction service provider system 108 may include and/or access one or more internal and/or external databases that store transaction data associated with transactions processed and/or being processed in transaction processing network 101 (e.g., prior or historical transactions processed via transaction service provider system 108, etc.), account data, input data, output data, update data, sorted data, and/or the like.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
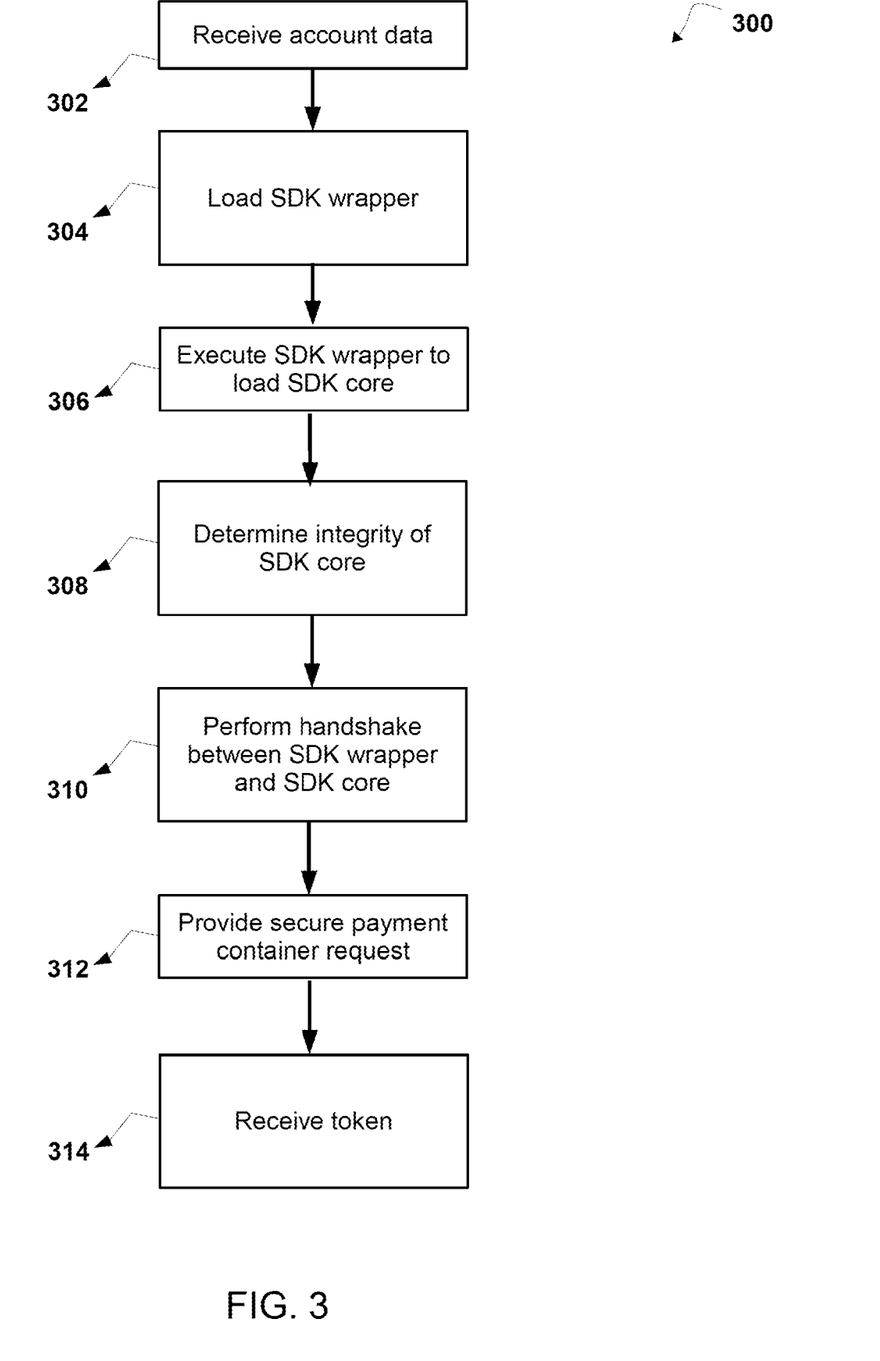
FIG. 3 is a flowchart of non-limiting embodiments or aspects of a process for dynamically ensuring software development kit (SDK) integrity.

Referring now to FIG. 3, FIG. 3 is a flowchart of non-limiting embodiments or aspects of a process 300 for dynamically ensuring SDK integrity. In some non-limiting embodiments or aspects, one or more of the steps of process 300 may be performed (e.g., completely, partially, etc.) by merchant system 102 (e.g., one or more devices of merchant system 102, etc.). In some non-limiting embodiments or aspects, one or more of the steps of process 300 may be performed (e.g., completely, partially, etc.) by another device or a group of devices separate from or including merchant system 102, such as payment gateway system 104 (e.g., one or more devices of payment gateway system 104), acquirer system 106 (e.g., one or more devices of acquirer system 106), transaction service provider system 108 (e.g., one or more devices of transaction service provider system 108). issuer system 110 (e.g., one or more devices of issuer system 110), and/or user device 112 (e.g., one or more devices of a system of user device 112).

Figure 4:
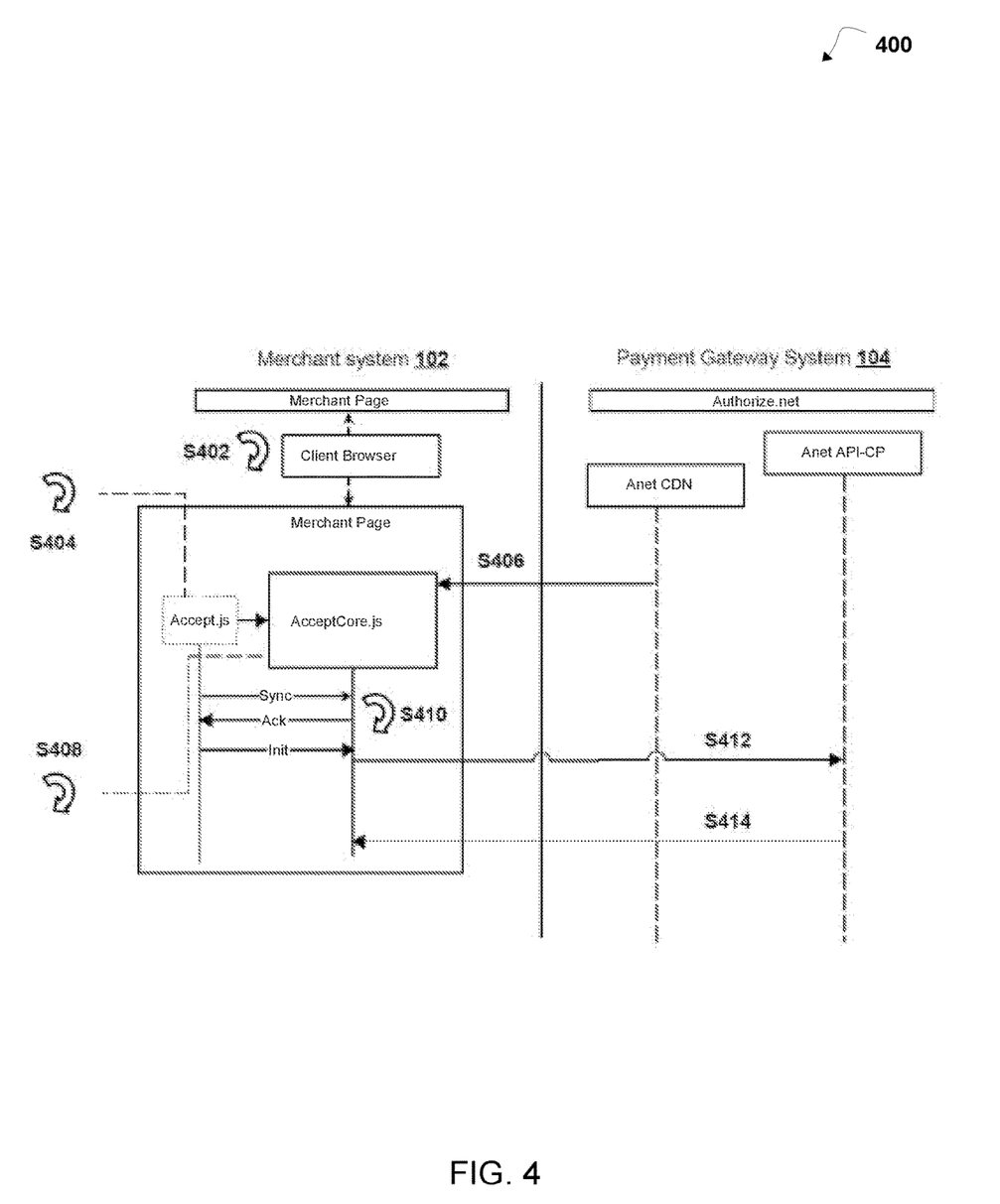
FIG. 4 is a signal flow diagram of an implementation of a non-limiting embodiment or aspect of a process for dynamically ensuring SDK integrity.

As shown in FIG. 3, at step 302, process 300 includes receiving account data. For example, merchant system 102 may receive account data. As an example, merchant system 102 may receive via a merchant webpage associated with merchant system 102, account data (e.g., a PAN, transaction data, etc.) associated with an account of a user. In such an example, the merchant webpage may include an HTML form tag that creates a submit button on the merchant webpage with the Accept.js library. For example, the action parameter of the form may be set to point at a response handler script, and the submit button may be configured to interact with the AcceptUI portion of the Accept.js library. As an example, and referring also to FIG. 4, which is a signal flow diagram of an implementation 400 of a non-limiting embodiment or aspect of a process for dynamically ensuring SDK integrity, at step S402, a user may click the submit button in a client browser of the user on user device 112 to open the payment information form, fill out the form with the user's payment information, such as account data, and submit the form using the submit button to merchant system 102, and merchant system 102 may send the payment information to payment gateway system 104 (e.g., Authorize.net, etc.) as described herein in more detail.

As shown in FIG. 3, at step 304, process 300 includes loading an SDK wrapper. For example, merchant system 102 may load an SDK wrapper. As an example, merchant system 102 may load an SDK wrapper (e.g., an Accept.js library, etc.) from payment gateway system 104 via the merchant webpage associated with merchant system 102. In such an example, and referring again to FIG. 4, at step S404, the SDK wrapper may be loaded from payment gateway system 104 in response to receiving the account data via the merchant webpage.

In some non-limiting embodiments or aspects, in response to loading the Accept.js library, the Accept.js library exports a real function (e.g., a tokenization function, a secure payment container request function, etc.) as a public method, and if the public method is called by merchant system 102, the public method throws an error. Accordingly, merchant system 102 may be forced to implement the AcceptCore.js library, which is automatically loaded by the Accept.js library as described in more detail herein.

As shown in FIG. 3, at step 306, process 300 incudes executing an SDK wrapper to load an SDK core. For example, merchant system 102 may execute an SDK wrapper to load an SDK core. As an example, merchant system 102 may execute the SDK wrapper, wherein the SDK wrapper loads an SDK core (e.g., an AcceptCore.js library, etc.). In such an example, and referring again to FIG. 4, at step S406, the AcceptCore.js library may be automatically loaded from payment gateway system 104 (e.g., from a content delivery network (CDN) of Authorize.net, etc.) in response to merchant system 102 loading and/or executing the Accept.js library.

As shown in FIG. 3, at step 308, process 300 includes determining an integrity of an SDK core. For example, merchant system 102 may determine an integrity of an SDK core. As an example, merchant system 102 may determine the integrity of the SDK core. In such an example, and referring again to FIG. 4, at step S408, the Accept.js library automatically checks, in response to the AcceptCore.js library being loaded from payment gateway system 104, whether the integrity of the AcceptCore.js library matches a subresource integrity. In some non-limiting embodiments or aspects, determining the integrity of the SDK core includes performing a W3 subresource integrity check hash on the SDK core. For example, the Accept.js library may perform a W3 subresource integrity check hash on the AcceptCore.js library.

As shown in FIG. 3, at step 310, process 300 includes performing a handshake between an SDK wrapper and an SDK core. For example, merchant system 102 may perform a handshake between an SDK wrapper and an SDK core. As an example, in response to determining the integrity of the SDK core, merchant system 102 may perform a handshake between the SDK wrapper and the SDK core and overload a real function exported by the SDK wrapper (e.g., overload a tokenization function, a secure payment container request, etc.) with a real function of the SDK core (e.g., with a tokenization function of the SDK core, with a secure payment container request function of the SDK core, etc.). In such an example, and referring again to FIG. 4, at step S410, in response to the subresource integrity check hash matching the hash on the AcceptCore.js library, the AcceptCore.js library may automatically overload the real function exported by the Accept.js library and, at step S410, a handshake (e.g., a 3-way handshake including a synchronization, an acknowledgement, and an initialization, etc.) is automatically performed between the Accept.js library and the AcceptCore.js library, which ensures that the two libraries are always together (e.g., merchant system 102 cannot implement only the Accept.js library without performing an integrity check and cannot add the AcceptCore.js library directly to the merchant webpage itself, etc.).

As shown in FIG. 3, at step 312, process 300 includes providing a secure payment container request. For example, merchant system 102 may provide a secure payment container request. As an example, merchant system 102 may provide, via the SDK core, a secure payment container request to payment gateway system 104. In such an example, the secure payment container request may include the account data. In such an example, the secure payment container request may be automatically provided in response to a successful handshake between the SDK wrapper and the SDK core. For example, the SDK wrapper may throw an error in response to an unsuccessful handshake between the SDK wrapper and the SDK core, which may prevent merchant system 102 from providing, via the SDK core, the secure payment container request to payment gateway system 104. As an example, and referring again to FIG. 4, at step S412, the AcceptCore.js library may automatically provide the secure payment container request (e.g., with the tokenization function or API of the SDK core, with the secure payment container request function or API of the SDK core, etc.) to payment gateway system 104 (e.g., to a API CDN of Authorize.net, etc.) in response to a successful handshake between the Accept.js and AcceptCore.js libraries. In such an example, the secure payment container request may include the account data associated with the user of user device 112.

As shown in FIG. 3, at step 314, process 300 includes receiving a token. For example, merchant system 102 may receive a token. As an example, merchant system 102 may receive, from payment gateway system 104, a token associated with the account data in response to providing the secure payment container request. In such an example, and referring again to FIG. 4, at step S414, the AcceptCore.js library may receive, in response to providing the secure payment container request, the token associated with the account data included in the secure payment container request from payment gateway system 104.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:
   receiving, with at least one processor, at a merchant system via a merchant webpage associated with the merchant system, account data associated with an account of a user;
   loading, with at least one processor, at the merchant system, a Javascript wrapper library from a payment gateway system via the merchant webpage associated with the merchant system, wherein the Javascript wrapper library is loaded in response to receiving the account data via the merchant webpage, wherein, in response to loading the Javascript wrapper library, the Javascript wrapper library exports a secure payment container request function as a public method, and wherein the public method throws an error in response to being called by the merchant system;
   executing, with at least one processor, the Javascript wrapper library, wherein the Javascript wrapper library loads a Javascript core library when executed, and wherein the Javascript wrapper library automatically determines, in response to the Javascript core library being loaded, whether an integrity of the Javascript core library matches a subresource integrity;
   in response to determining that the integrity of the Javascript core library matches the subresource integrity, performing, with at least one processor, a handshake between the Javascript wrapper library and the Javascript core library and automatically overloading the secure payment container request function exported by the Javascript wrapper library with a secure payment container request function of the Javascript core library; and
   providing, with at least one processor, from the merchant system via the secure payment container request function of the Javascript core library, a secure payment container request to the payment gateway system, wherein the secure payment container request includes the account data.

2. The computer-implemented method of claim 1, wherein the merchant webpage includes an HTML form tag that creates a submit button on the merchant webpage with the Javascript wrapper library, wherein an action parameter of the HTML form tag is set to point at a response handler script, and wherein the submit button interacts with a user interface portion of the Javascript wrapper library.

3. The computer-implemented method of claim 1, wherein the Javascript core library receives, from the payment gateway system, in response to providing the secure payment container request, a token associated with the account data included in the secure payment container request.

4. The computer-implemented method of claim 1, wherein the Javascript wrapper library performs a W3 subresource integrity check hash on the Javascript core library to determine whether the integrity of the Javascript core library matches the subresource integrity.

5. A computer-implemented method, comprising:
   loading, with at least one processor, at a merchant system, a Javascript wrapper library from a payment gateway system via a merchant webpage associated with the merchant system, wherein, in response to loading the Javascript wrapper library, the Javascript wrapper library exports a secure container request function or a tokenization function as a public method, and wherein the public method throws an error in response to being called by the merchant system;
   executing, with at least one processor, the Javascript wrapper library, wherein the Javascript wrapper library loads a Javascript core library when executed, and wherein the Javascript wrapper library automatically determines, in response to the Javascript core library being loaded, whether an integrity of the Javascript core library matches a subresource integrity;
   in response to determining that the integrity of the Javascript core library matches the subresource integrity, performing, with at least one processor, a handshake between the Javascript wrapper library and the Javascript core library and automatically overloading the secure container request function or the tokenization function exported by the Javascript wrapper library with the secure container request function or the tokenization function of the Javascript core library; and
   providing, with at least one processor, from the merchant system via the secure container request function or the tokenization function of the Javascript core library, a secure container request to the payment gateway system.

6. A system, comprising:
   one or more processors programmed and/or configured to:
   receive, at a merchant system via a merchant webpage associated with the merchant system, account data associated with an account of a user;
   load, at the merchant system, a Javascript wrapper library from a payment gateway system via the merchant webpage associated with the merchant system, wherein the Javascript wrapper library is loaded in response to receiving the account data via the merchant webpage, wherein, in response to loading the Javascript wrapper library, the Javascript wrapper library exports a secure payment container request function as a public method, and wherein the public method throws an error in response to being called by the merchant system;
   execute, the Javascript wrapper library, wherein the Javascript wrapper library loads a Javascript core library when executed, and wherein the Javascript wrapper library automatically determines, in response to the Javascript core library being loaded, whether an integrity of the Javascript core library matches a subresource integrity;

in response to determining that the integrity of the Javascript core library matches the subresource integrity, perform a handshake between the Javascript wrapper library and the Javascript core library and automatically overload the secure payment container request function exported by the Javascript wrapper library with a secure payment container request function of the Javascript core library; and provide, from the merchant system via the secure payment container request of the Javascript core library, a secure payment container request to the payment gateway system, wherein the secure payment container request includes the account data.

7. The system of claim 6, wherein the merchant webpage includes an HTML form tag that creates a submit button on the merchant webpage with the Javascript wrapper library, wherein an action parameter of the HTML form tag is set to point at a response handler script, and wherein the submit button interacts with a user interface portion of the Javascript wrapper library.

8. The system of claim 6, wherein the Javascript core library receives, from the payment gateway system, in response to providing the secure payment container request, a token associated with the account data included in the secure payment container request.

9. The system of claim 6, wherein the Javascript wrapper library performs a W3 subresource integrity check hash on the Javascript core library to determine whether the integrity of the Javascript core library matches the subresource integrity.

10. A system, comprising:
one or more processors programmed and/or configured to:
load, at a merchant system, a Javascript wrapper library from a payment gateway system via a merchant webpage associated with the merchant system, wherein, in response to loading the Javascript wrapper library, the Javascript wrapper library exports a secure container request function or a tokenization function as a public method, and wherein the public method throws an error in response to being called by the merchant system;

execute, the Javascript wrapper library, wherein the Javascript wrapper library loads a Javascript core library when executed, and wherein the Javascript wrapper library automatically determines, in response to the Javascript core library being loaded, whether an integrity of the Javascript core library matches a subresource integrity;

in response to determining that the integrity of the Javascript core library matches the subresource integrity, perform a handshake between the Javascript wrapper library and the Javascript core library and automatically overload the secure container request function or the tokenization function exported by the Javascript wrapper library with the secure container request function or the tokenization function of the Javascript core library; and provide, from the merchant system via the secure container request function or the tokenization function of the Javascript core library, a secure container request to the payment gateway system.

11. A computer-implemented method, comprising:
providing, with at least one processor, from a payment gateway system, a Javascript wrapper library to a merchant system via a merchant webpage associated with the merchant system, wherein the Javascript wrapper library is provided in response to the merchant system receiving account data via the merchant webpage, wherein, in response to being loaded, the Javascript wrapper library exports a secure payment container request function as a public method, and wherein the public method throws an error in response to being called by the merchant system;

in response to the merchant system executing the Javascript wrapper library, automatically providing, with at least one processor, from the payment gateway system, a Javascript core library to the merchant system, wherein, in response to the Javascript core library being loaded, the Javascript wrapper library automatically determines whether an integrity of the Javascript core library matches a subresource integrity, and wherein, in response to determining that the integrity of the Javascript core matches the subresource integrity, the Javascript core library automatically performs a handshake between the Javascript wrapper library and the Javascript core library and overloads the secure payment container request function exported by the Javascript wrapper library with the secure payment container request function of the Javascript core library;

receiving, with at least one processor, at the payment gateway system, a secure payment container request from the merchant system via the secure payment container request function of the Javascript core library, wherein the secure payment container request includes the account data; and in response to receiving the secure payment container request, providing, with at least one processor, from the payment gateway, a token associated with the account data included in the secure payment container request to the merchant system.

12. The computer-implemented method of claim 11, wherein the Javascript core library automatically provides the secure payment container request to the payment gateway system in response to the handshake between the Javascript wrapper library and the Javascript core library being successful.

13. The computer-implemented method of claim 11, wherein the Javascript wrapper library throws an error in response to an unsuccessful handshake between the Javascript wrapper library and the Javascript core library.

14. A system, comprising:
one or more processors programmed and/or configured to:
provide, from a payment gateway system, a Javascript wrapper library to a merchant system via a merchant webpage associated with the merchant system, wherein the Javascript wrapper library is provided in response to the merchant system receiving account data via the merchant webpage, wherein, in response to being loaded, the Javascript wrapper library exports a secure payment container request function as a public method, and wherein the public method throws an error in response to being called by the merchant system;

in response to the merchant system executing the Javascript wrapper library, automatically provide, from the payment gateway system, a Javascript core library to the merchant system, wherein, in response to the Javascript core library being loaded, the Javascript wrapper library automatically determines whether an integrity of the Javascript core library matches a subresource integrity, and wherein, in response to determining that the integrity of the Javascript core library matches the subresource integrity, the Javascript core library automatically performs a handshake between the Javascript wrapper library and the Javascript core library and overloads the secure payment container request function exported by the Javascript wrapper library with the secure payment container request function of the Javascript core library;

receive, at the payment gateway system, a secure payment container request from the merchant system via the secure payment container request function of the Javascript core library, wherein the secure payment container request includes the account data; and in response to receiving the secure payment container request, provide, from the payment gateway, a token associated with the account data included in the secure payment container request to the merchant system.

15. The system of claim 14, wherein the Javascript core library automatically provides the secure payment container request to the payment gateway system in response to the handshake between the Javascript wrapper library and the Javascript core library being successful.

16. The system of claim 14, wherein the Javascript wrapper library throws an error in response to an unsuccessful handshake between the Javascript wrapper library and the Javascript core library.

* * * * *